May 9, 1944.  C. S. NUDELMAN ET AL  2,348,304
COMBINATION SERVER AND SQUEEZER FOR CITRUS FRUITS
Filed March 31, 1941
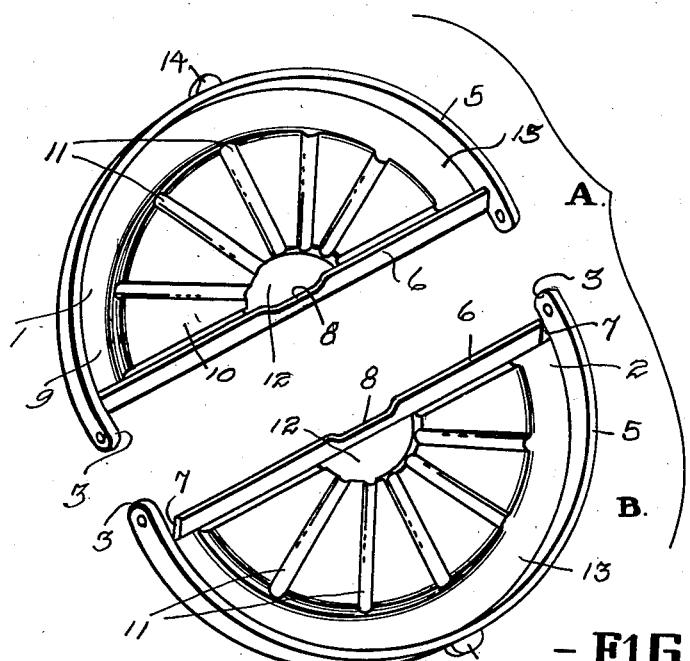
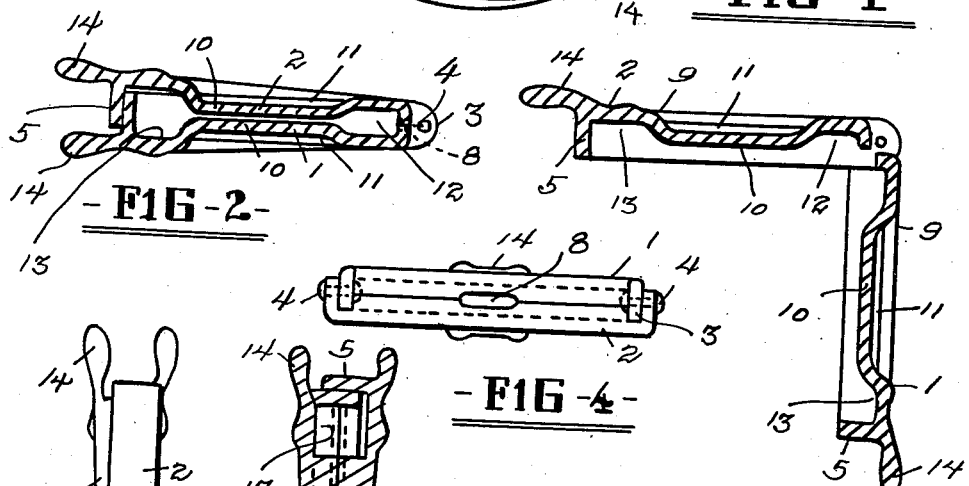
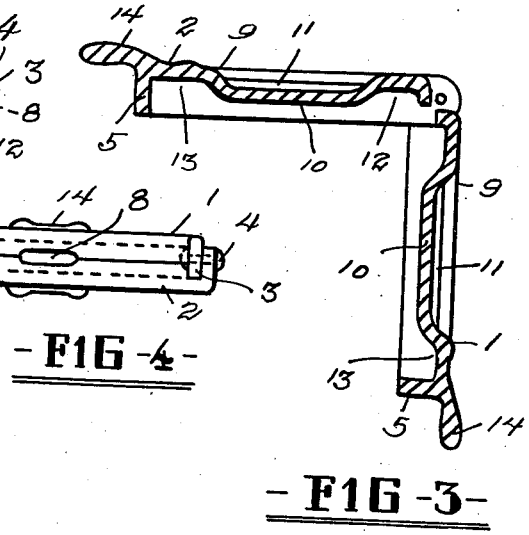
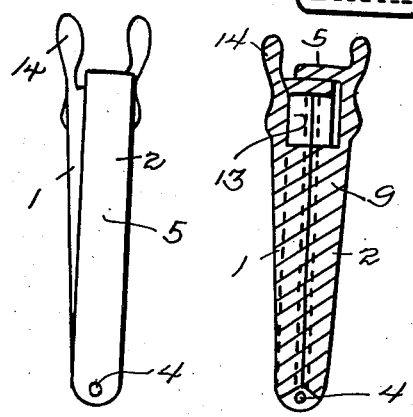
Inventors
CHARLES S. NUDELMAN AND
RALPH C. MEILACH,
By
Attorney Patented May 9, 1944

2,348,304

UNITED STATES PATENT OFFICE 2,348,304

COMBINATION SERVER AND SQUEEZER FOR CITRUS FRUITS

Charles S. Nudelman and Ralph C. Meilach, Chicago, Ill.

Application March 31, 1941, Serial No. 386,170

2 Claims. (Cl. 100—41)

Our invention, in its broad aspect, has to do with serving and squeezing devices for all types of citrus fruits such as oranges, lemons and the like, and more particularly it is our purpose to provide a device of this character which operates upon segments or slices of such citrus fruits to squeeze the juice from the same and serve the juice directly to or upon the object desired such for instance as into a beverage such as iced tea or the like or upon a food such as a salad or the like.

At the present time lemon slices are served at the table on a plate to be squeezed and served individually by hand into tea or upon salads and other dishes. When so squeezed and served by hand it is not unusual to squirt some of the citrus juice on table linens, on clothes, and in any event the hands touch the slice or segment possibly furnishing a source of contamination, and soiling the fingers. Our invention is designed to eliminate these undesirable features, and at the same time our device may be inexpensively manufactured as a metal stamping or molded from plastics or the like, and is pleasing in appearance since the metal may be decorated or polished or provided with designs, or the plastics colored, or transparent or otherwise suitably treated to furnish a desirable table ornament, as well as a useful accessory. It is simple in construction, completely encases and shields a slice of lemon or other citrus fruit, is easily cleaned and has no fragile parts likely to become deranged or out of repair.

Furthermore, our combination squeezer and server directs the juice where it is desired without squirting or the like and more fully and completely squeezes the juice from the segment or slice of lemon or other citrus fruit, and it prevents soiling the hands, enables slices of the citrus fruit to be served and gracefully used individually, and it is otherwise desirable and useful.

Other and equally important advantages and objects of our invention will be apparent from the description of its parts and from the drawing illustrating the same, but it is emphasized that changes may be made in form, size, shape, construction and arrangement of parts, and in materials used in producing our invention without departing from the spirit and scope of our invention.

In the drawing wherein we have shown a preferred form of our invention:

Figure 1, views A and B show the two sections of our device disassembled to the extent that such parts are separated to show the form, shape and arrangement of the same;

Figure 2 is a transverse section of our device in closed position;

Figure 3 is a transverse section of our device with the sections partly opened up;

Figure 4 is a bottom edge view showing the serving opening;

Figure 5 is a side edge view, and

Figure 6 is a transverse section of a form wherein the body part of each section is more or less solid.

In the drawing wherein like characters of reference are used to designate like or similar parts throughout the several views:

The numeral 1 designates one section of our combination server and squeezer and 2 the other section. Section 1 is slightly smaller than the other section designated 2 and is designed to be received therein as shown in Figure 2, therefore section 1 will be hereinafter designated the "male" section, and section 2 the "female" section. In other respects the two sections are alike in form and construction, and the description of parts applicable to one section is applicable to the other. The sections are each formed with lugs 3 to receive small rivets or the like 4 to hingedly connect the sections together at their ends as shown in Figures 2, 3, 4 and 5.

Each section is semi-circular in shape and has an edge flange 5 and a bottom rib or bar 6; the rib or bar 6 of section 2 is cut away at its ends as at 7 to receive the flange of section 1 when the sections are closed, and each section has a bottom opening 8 midway its ends through which juice is dispensed from the segment or slice of citrus fruit, such as a lemon, squeezed between the sections.

The body part 9 of each section has a semi-circular raised part 10 traversed radially by grooves 11 or depressions leading to a central depression 12 in the nature of the arrangement of spokes from the hub of a wheel. The depressed or grooved part 13 about the raised part 10 serves to receive the rind of the citrus fruit while the juice is squeezed between the raised parts 10 and travels down the grooves or depressions 11 to the central depression 12 and thence to opening 8 from which it is dispensed into the iced tea or other beverage or upon the salad or other food, or the like. It will be noted that the segment of fruit is completely enclosed between the sections and that juice is dispensed from only one point, and that the sections are designed to be quickly cleaned and there are no fragile or intricate parts. Finger tabs 14 are provided for grasping and pressing the sections together.

While it is believed that the operation and advantages of our invention is apparent from the foregoing, attention is called to the fact that the scope of our invention is to be determined only from the claims.

We claim:

1. A combination server and squeezer for citrus fruits comprising similarly formed, hingedly connected arcuately flanged sections, one fitting into the other with the flanges overlapping, and each provided with a central raised portion between which portions the juice is squeezed, and grooved to direct the juice to a common point adjacent the hinge, and a single central dispensing opening at the point of juice concentration through which the juice is projected.

2. A device of the character described comprising similarly formed, semi-circular, hingedly connected arcuately flanged sections, one fitting into the other with the flanges overlapping to enclose a slice of citrus fruit therebetween; each section having a depressed portion adjacent the hinge to receive the rind, and a raised portion, between which raised portions the juice is squeezed, and the sections being radially grooved from a common point adjacent and midway between the ends of the hinge to concentrate the juice in a central depressed portion and a centrally located dispensing opening at the depressed portion through which the juice is projected and finger tabs for manipulating the sections.

CHARLES S. NUDELMAN.
RALPH C. MEILACH.